United States Patent [19]

Fowler

[11] Patent Number: 4,705,936
[45] Date of Patent: Nov. 10, 1987

[54] ELECTRONICALLY CONTROLLED ELECTRIC STEAM HUMIDIFIER

[75] Inventor: James M. Fowler, Houston, Tex.

[73] Assignee: Masco Corporation, Taylor, Mich.

[21] Appl. No.: 692,389

[22] Filed: Jan. 17, 1985

[51] Int. Cl.[4] .......................... H05B 1/02; H05B 3/60; F22B 1/30
[52] U.S. Cl. ..................................... 219/295; 122/379; 219/272; 219/273; 219/275; 219/286; 219/288; 219/289; 219/293; 219/362; 261/142; 261/DIG. 46
[58] Field of Search ................................ 219/284–295, 219/271–276, 362; 261/142, DIG. 46; 338/80–86; 122/379

[56] References Cited

U.S. PATENT DOCUMENTS

| | | |
|---|---|---|
| 3,269,364 | 8/1966 | Higgins . |
| 3,584,193 | 6/1971 | Badertscher ..................... 219/289 |
| 3,629,550 | 12/1971 | Carlsson ........................... 219/285 |
| 3,643,930 | 2/1972 | Schulze ......................... 219/273 X |
| 3,651,753 | 3/1972 | Schmidt ........................ 219/295 X |
| 3,682,141 | 8/1972 | Johansen ....................... 219/273 X |
| 3,761,679 | 9/1973 | Dall .................................... 219/288 |
| 3,780,261 | 12/1973 | Eaton-Williams ............. 219/284 X |
| 3,937,920 | 2/1976 | Gundacker et al. .......... 219/295 X |
| 3,944,785 | 3/1976 | Eaton-Williams ............... 219/286 |
| 4,029,937 | 6/1977 | Russell .............................. 219/295 |
| 4,093,847 | 6/1978 | Walker et al. ................. 219/295 X |
| 4,146,775 | 3/1979 | Kirchner et al. ................ 219/295 |
| 4,196,341 | 4/1980 | Williams ........................... 219/295 |
| 4,262,191 | 4/1981 | Lepper et al. ................. 219/295 X |
| 4,347,430 | 8/1982 | Howard-Leicester et al. .... 219/295 |
| 4,382,173 | 5/1983 | Howard-Leicester ............ 219/295 |

FOREIGN PATENT DOCUMENTS

2314474 10/1974 Fed. Rep. of Germany ...... 219/295
2279448 2/1976 France ............................. 219/295

OTHER PUBLICATIONS

"Electronic Electrode Steam Humidifiers", (form 79-5), Nortec Industries Inc., Ogdensburg, N.Y., 13699.
Autoflo X-15 Power Humidifier, S-X-15-6'78, Autoflo Division of Masco Corp., Detroit, Mich., 48239.

Primary Examiner—Anthony Bartis
Attorney, Agent, or Firm—Leon E. Redman; Malcolm L. Sutherland; Steven L. Permut

[57] ABSTRACT

An electronic steam humidifier includes a reservoir drawer having boiling electrodes submerged in water provided by a solenoid fill valve energized by a dual reference level current start-up circuit which is responsive to the current flow through the water from an AC source as measured by a current detection circuit. A system operation counter initiates a flush/drain operation after a certain time period of operation to flush mineral deposits from the reservoir through a siphon tube to a drain trough. A current control circuit includes a pulse width modulator connected to a triac for reducing the average current to the boiling electrodes during an overcurrent condition as indicated by a comparator coupled to the current detection circuit. A reservoir interlock mechanism initiates a flush/drain operation when the reservoir drawer assembly is removed for maintenance. A blower control energizes a blower relay so that a furnace or air conditioner blower may be operated to distribute the steam generated by the humidifier.

13 Claims, 13 Drawing Figures

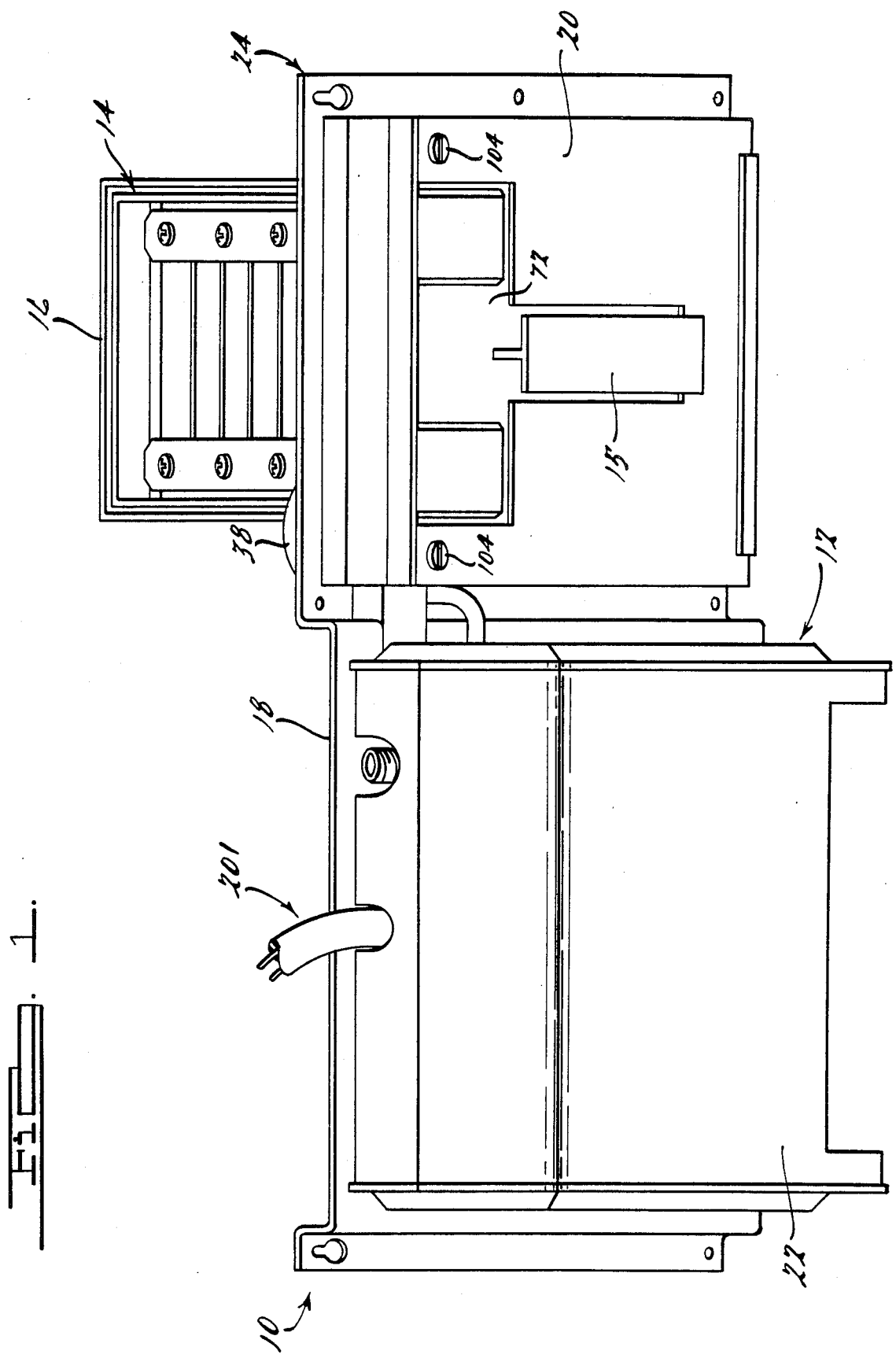

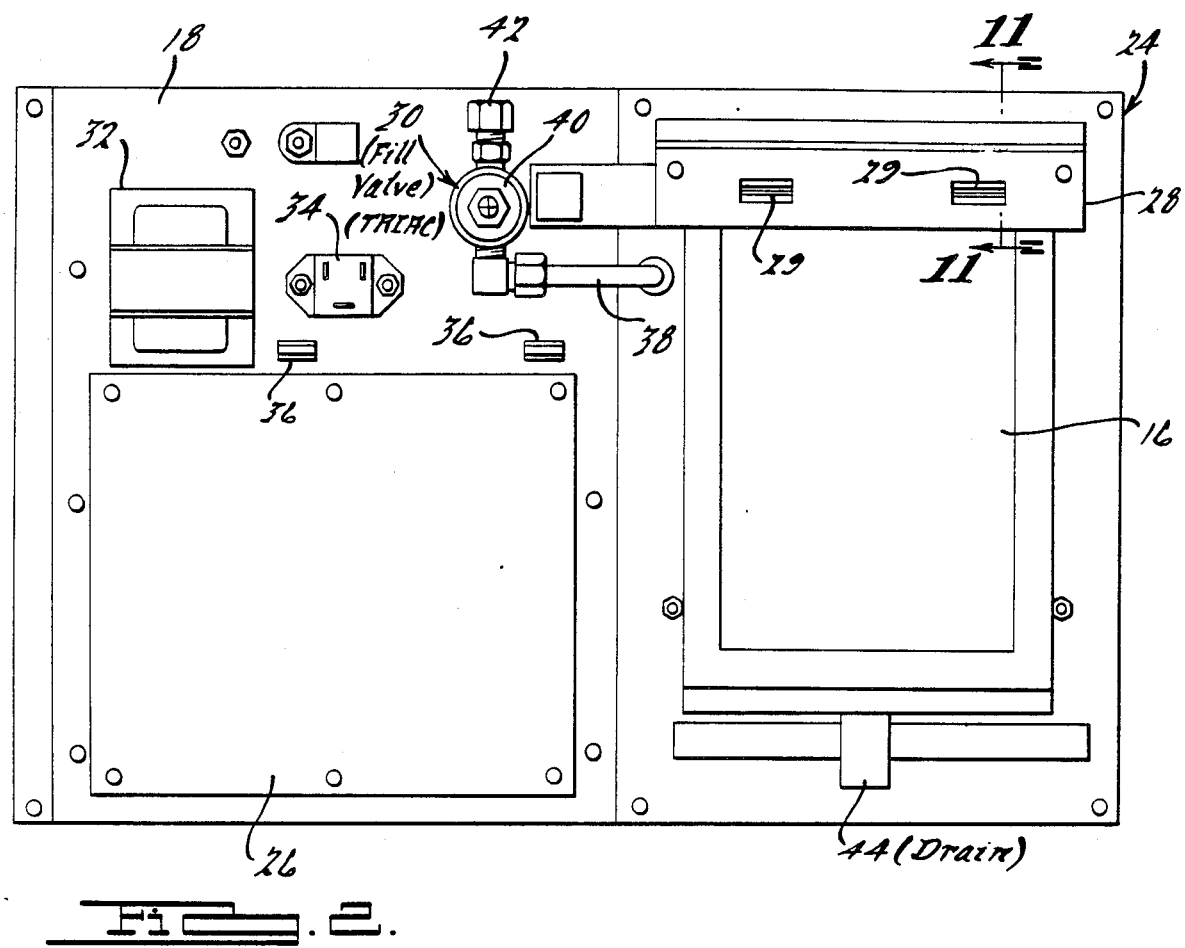
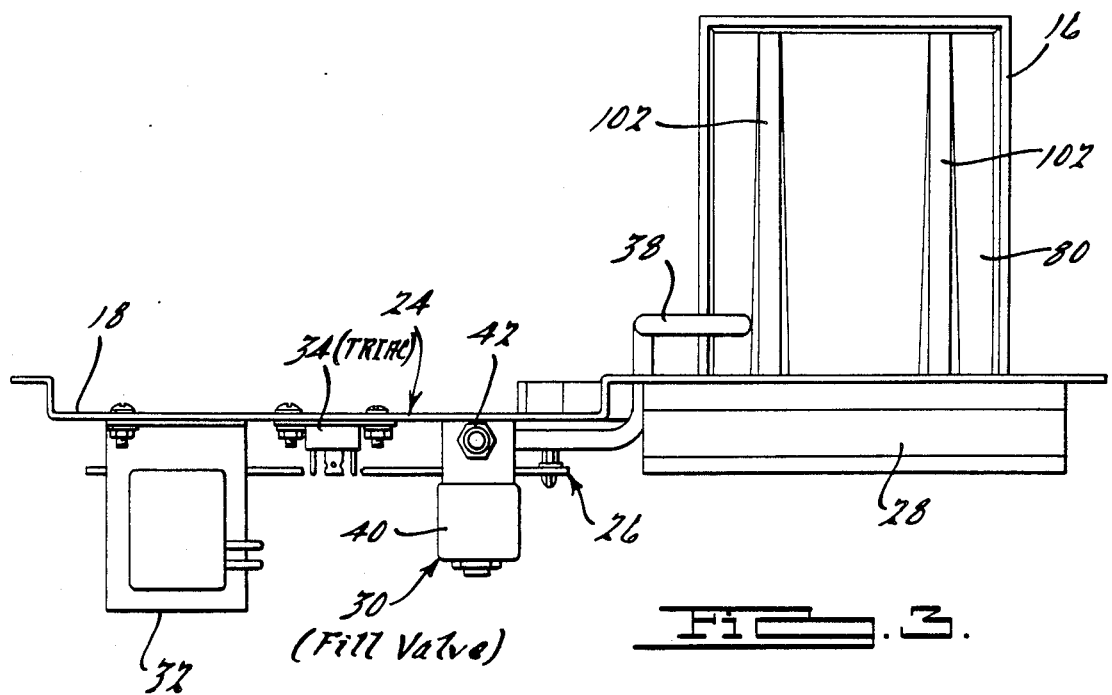

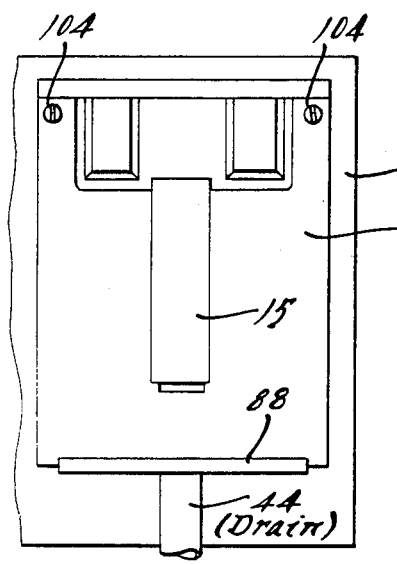
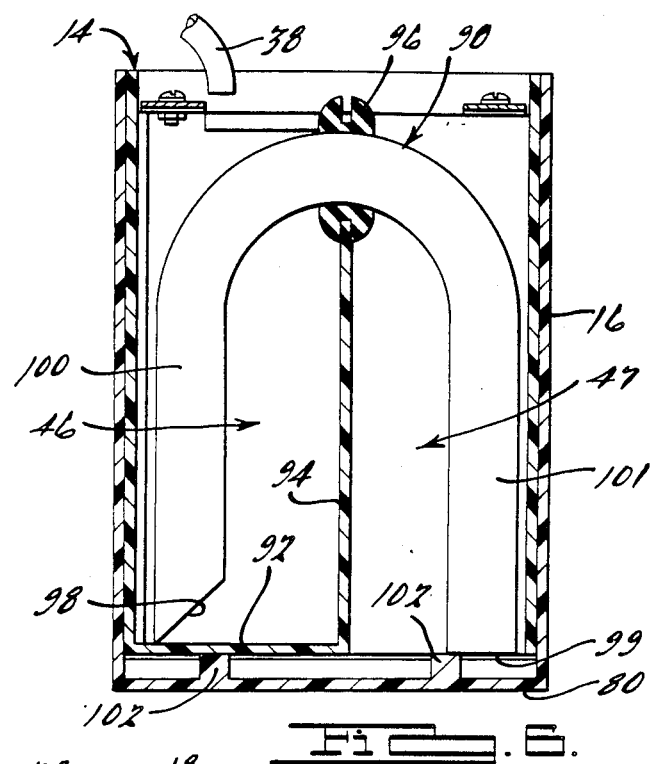
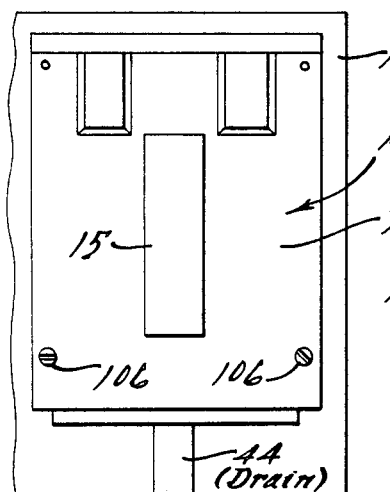
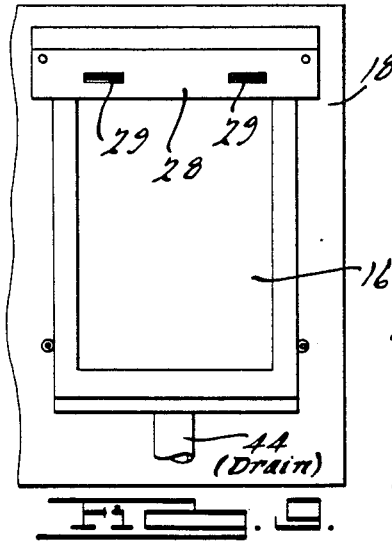
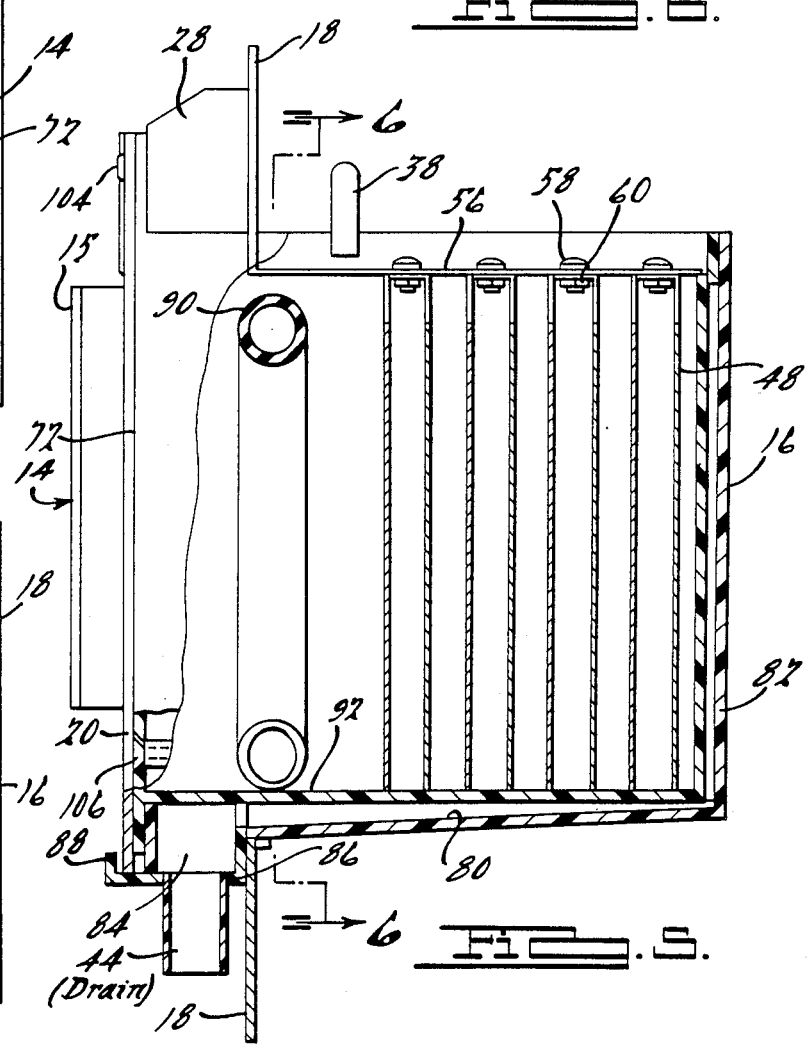

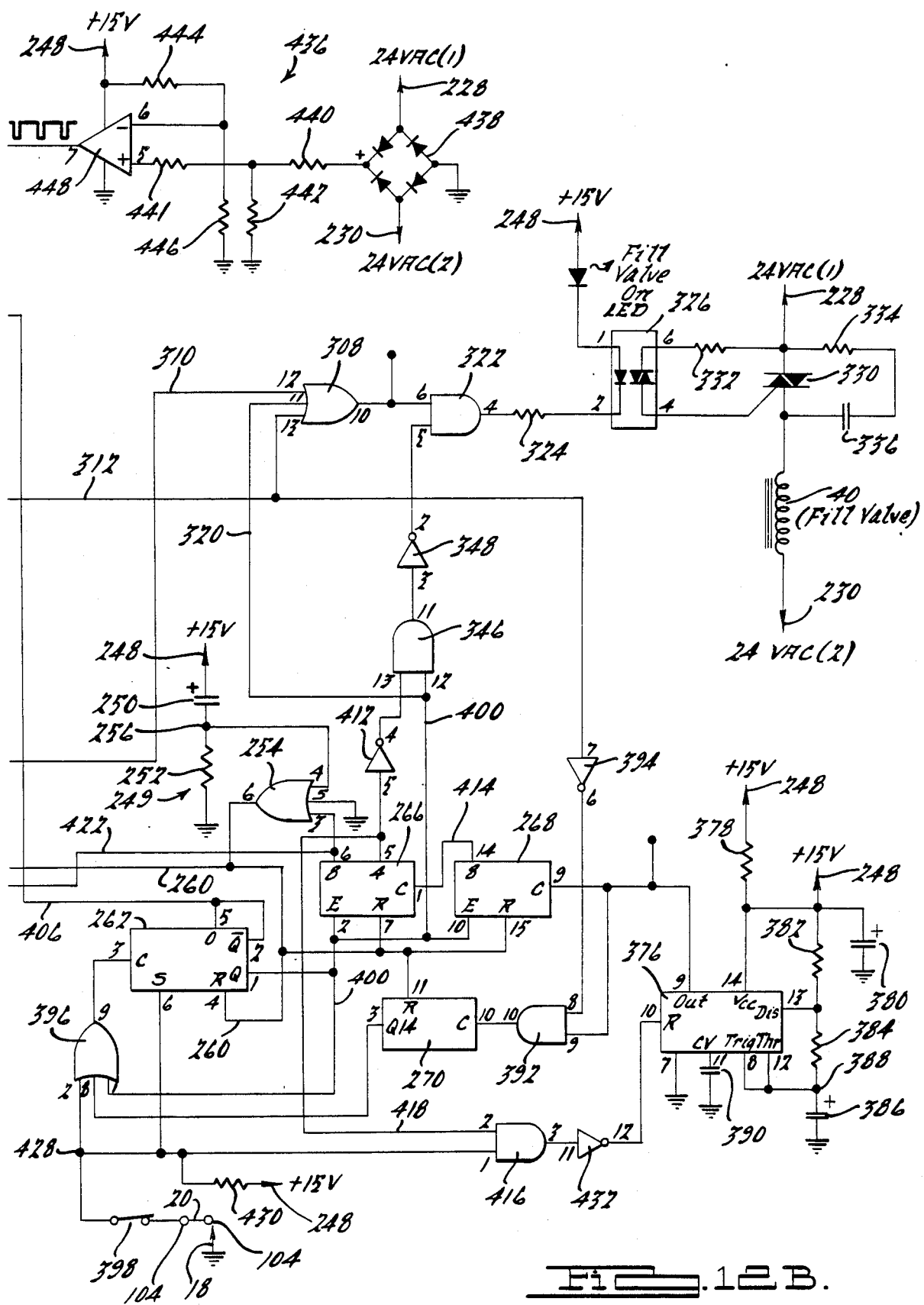

ELECTRONICALLY CONTROLLED ELECTRIC STEAM HUMIDIFIER

This invention relates to an electronically controlled steam humidifier and more particularly, to a humdifier which is highly reliable, quiet and efficient in operation. The humidifier is adapted to be easily installed in exisint forced-air systems and is economically manufactured with a greatly reduced number of parts. Maintenance requirements are greatly reduced by minimizing the buildup of mineral deposits. When maintenance is required, parts are readily accessible with an interlock system to remove hot water from the boiling reservoir prior to user access for maintenance.

BACKGROUND OF THE INVENTION

Electrode steam humidifiers have proven to be effective in adding humidity in forced-air furnace systems. The low plenum temperatures in many high efficiency furnaces, heat pumps and electric furnaces cannot provide enough heat for evaporative type humidifiers to operate properly. Despite this, prior steam humidifiers have not gained widespread acceptance, partly due to their cost and also the build up of minerals on the boiling electrodes significantly reduces their efficiency and requires frequent maintenance for conventional steam humidifiers.

Prior electronically controlled steam humidifiers have attempted to employ current detection circuitry to maintain current within a predetermined range. However, these prior humidifiers have not adequately addressed the fact that cold water is less conductive than hot water and the fact that soft water is less conductive than hard water.

Other electronically controlled steam humidifiers have been quite costly to manufacture due to the complexity and the number of costly components required. A significant cost of systems which provide flush and drain operations is associated with providing a solenoid operated drain valve in addition to the required fill valve.

Furthermore, prior art steam humidifiers have not been sufficiently reliable in handling excessive current conditions and are limited to operation only when both the humidifier senses the need for additional humidity and the furnace blower is on as dictated by the furnace circuit sensing the need for additional heat rather than in response to only the need for additional humidity without heat.

Examples of control circuits which may relate to electrode type steam humidifiers are disclosed in U.S. Pat. Nos. 3,269,364 to Higgins, 3,629,550 to Carlsson, 3,651,753 to Schmidt, 3,682,141 to Johansen, 3,761,6799 to Dall, 3,780,261 to Eaton-Williams, 3,937,920 to Gundacker et al, 3,944,785 to Eaton-Williams, 4,029,937 to Russell, 4,093,847 to Walker et al, 4,146,775 to Kirchner et al, 4,196,341 to Williams, 4,262,191 to Lepper et al, 4,347,430 to Howard-Liecester et al, 4,382,173 to Howard-Liecester, French Pat. No. 2,279,448 and German Pat. No. 2,314,474, as well as a model X-15 steam humidifier sold by Autoflo Company, a division of the assignee of the present invention, and the series of electrode humidifiers sold under the model designation Condair ES by Nortec Industries, Inc. of Ogdensburg, N.Y.

SUMMARY OF THE INVENTION

This invention was evolved with the general object of providing an electronically controlled steam humidifier which can be readily and economically manufactured while being highly efficient and reliable in operation. Another object of the invention is to provide an electronically controlled steam humidifier which can be readily installed in existing forced-air systems. A further object of this invention is to provide an electronically controlled steam humidifier which is capable of fast response to the demand for additional humidity and which does not require high furnace plenum temperatures to evaporate water for generating moisture. An additional object of the invention is to greatly reduce maintenance requirements and to facilitate maintenance when it is required.

In an electronically controlled steam humidifier constructed in accordance with the invention, alternating current is selectively applied to boiling electrodes disposed within a reservoir assembly for conducting current through water provided to the reservoir by a solenoid operated water fill valve. A current detection circuit which senses the magnitude of current flow through the water is connected to a two-stage current start up circuit. During an initial fill operation, the current start up circuit operates in a first stage to shut off the fill valve after a current level is attained which is less than the normal operating current after the water has been heated. The second stage of the two-stage current start up circuit is initiated in response to a drop in current detected by the current detection circuit when the water has been sufficiently heated to commence boiling and a small amount of water has boiled off. The two-stage current start up circuit then establishes a much higher current threshold commensurate with the current at which the system will then operate. Without the two-stage current start up circuit, too much cold water, which is less conductive than hot water, would need to be added to reach the normal operating current threshold. Then when the water was heated, the current could rise to almost twice the threshold level resulting in an excessive current condition. The two-stage current start up similarly operates to prevent an oversupply of extremely soft, less conductive water.

Another feature of the electronically controlled steam humdifier of the present invention is the use of a counter to accumulate the time that the humidifier is operating in a steam generation condition so that a flush/drain cycle may be initiated whenever the humidifier has reached a predetermined operating time to remove mineral deposits while they are still in solution rather than crusted onto the boiling electrodes and the inside walls of the boiling reservoir.

Another important aspect of the present invention is the use of a single solenoid fill valve to effect not only fill operations when additional water is required to replenish water which has boiled away thereby maintaining current flow within a predetermined range, but also to effect the flush/drain operation without the need for a separate drain valve which would be an expensive component and require additional complex control circuitry. In accordance with this specific feature, a flush/drain timer provides timing signals to logic circuitry for energizing the fill valve until sufficient water has been added to the reservoir such that its level reaches the top of a siphon tube extending from the bottom of the reservoir toward the floor of a drain tank. The fill valve is then de-energized and maintained off until the flush/drain timer indicates the completion of the siphon and drain operation and a fresh two-stage current start up is enabled.

Another important aspect of the current invention is the use of pulse width modulation to reduce the average current selectively applied to the boiling electrodes during an excessive current condition such as may occur under unusually salty water conditions or when too much water has been added to the reservoir due to unusually high water pressure.

A further feature relates to the provision of a reservoir interlock mechanism which initiates an automatic flush/drain operation prior to removal of the reservoir for maintenance.

Another feature relates to a blower control circuit for energizing a blower relay to distribute steam throughout the forced-air system when additional humidity is required independent of other air treatment requirements.

Other objects, advantages and meritorious features of the present invention will be more fully understood from the following description of the preferred embodiment, the appended claims and the drawings which are briefly described below.

BRIEF DESCRIPTION OF THE DRAWINGS

FIG. 1 is a front perspective view illustrating the electronically controlled steam humidifier of the present invention;

FIG. 2 is a front elevational view of the humidifier mounting plate assembly of the humidifier of FIG. 1;

FIG. 3 is a top plan view of the humidifier mounting plate assembly of FIG. 2;

FIG. 5 is a side elevational, partially segmented view of the reservoir drawer assembly of FIG. 4 installed in the drain tank of the humidifier mounting plate assembly shown in FIGS. 2 and 3;

FIG. 6 is a cross-sectional view of the reservoir drawer assembly installed in the drain tank taken along the line 6—6 shown in FIG. 5;

FIG. 7 is a fragmentary front elevational view showing the tank interlock plate of the humidifier of FIG. 1 secured in place;

FIG. 8 is a fragmentary front elevational view showing the reservoir drawer assembly secured to the drain tank after the tank interlock plate has been removed;

FIG. 9 is a fragmentary front elevational view of the drain tank and mounting plate assembly with both the tank interlock plate and reservoir drawer assembly removed;

FIGS. 12a and 12b comprise a schematic diagram of the electronically controlled steam humidifier of the present invention;

DETAILED DESCRIPTION OF THE PREFERRED EMBODIMENT

Figure 4:
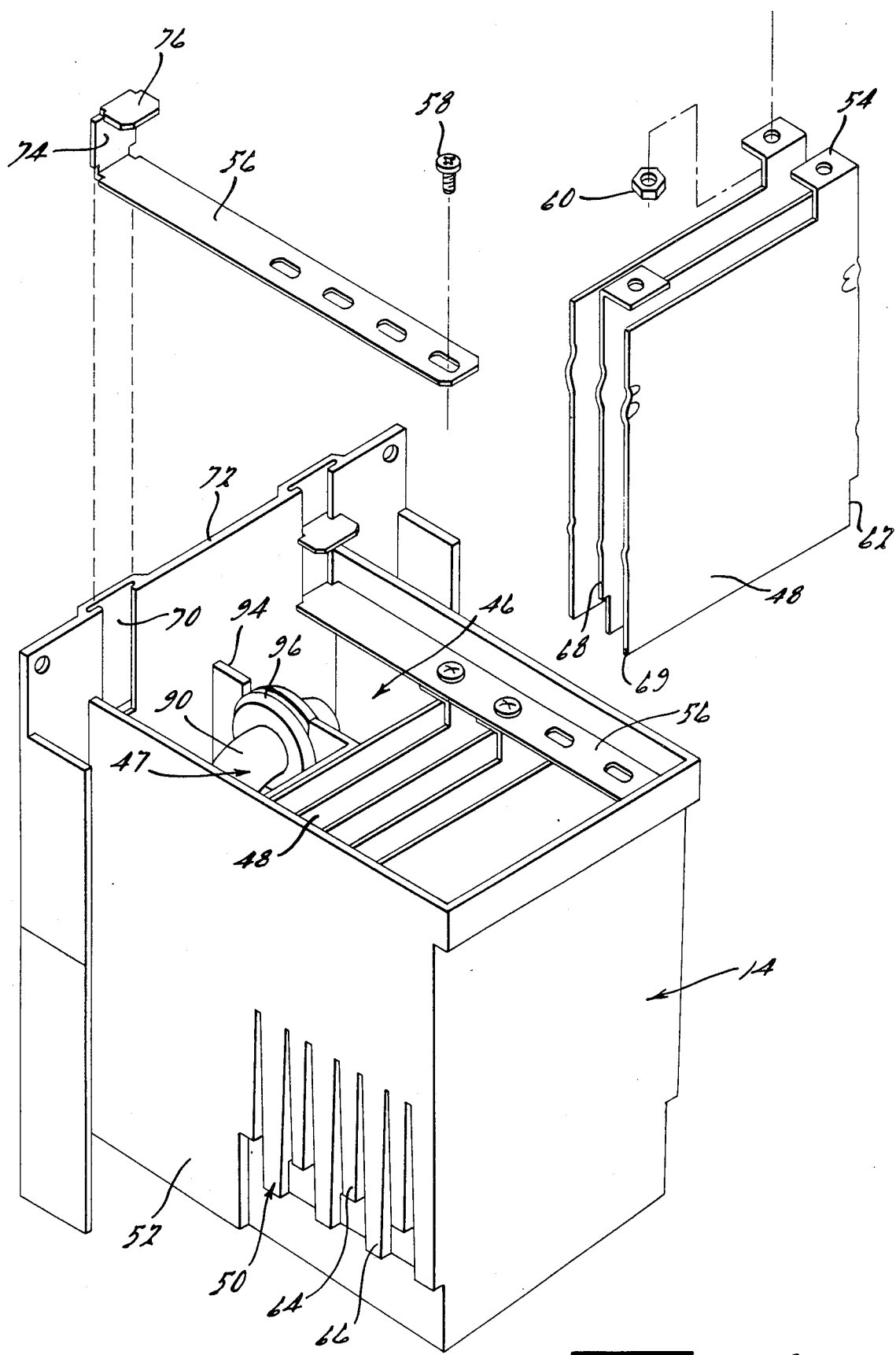
FIG. 4 is an enlarged top, right, rear perspective and partially exploded view of the boiling reservoir drawer assembly of the humidifier of FIG. 1.

Reference numeral 10 generally designates an electronically controlled steam humidifier constructed in accordance with the principles of the present invention. The electronic steam humidifier of the present invention includes an electronic control section 12 secured to a mounting plate 18. A reservoir assembly 14 comprises a drawer-like unit which is disposed within a drain tank 16 which also is secured to the mounting plate 18. A tank interlock plate 20 is secured at the front of the reservoir drawer assembly. The electronic control section 12 may include an electronic control housing 22 which protects the circuit components of the electronic control section 12.

FIG. 2 illustrates the humidifier mounting plate assembly generally referred to as reference numeral 24. Secured to the mounting plate 18 of the mounting plate assembly 24 are the drain tank 16, a circuit board assembly 26, a raceway housing 28, a fill valve assembly 30, a 24 volt AC transformer 32, a triac 34, and a plurality of wire guides 36. The valve assembly 30 includes a fill tube 38 which extends from the outlet of a 24 volt AC solenoid actuated fill valve 40 through the mounting plate 18. The outlet portion of the fill tube 38 is disposed above and directed downwardly toward the drain tank 16. A compression fitting 42 is provided on the inlet of the fill valve 40 for connection to a supply of tap water via a conventional water supply tube (not shown). A drain tube 44 extends downwardly from the bottom of the drain tank 16.

Figure 11:
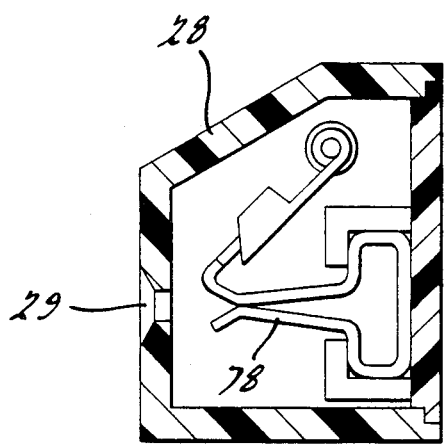
FIG. 11 is a side elevational view in cross section taken along the line 11—11 of FIG. 2 illustrating the configuration of the contact clip assembly within the raceway of the mounting plate assembly of FIG. 2.

FIG. 4 illustrates the configuration of the reservoir drawer assembly 14 of FIG. 1 in greater detail. The reservoir drawer assembly includes a boiling tank 46 which is open at the top to permit steam generated therein to be carried through a duct of either an air conditioner or furnace system with the aid of a conventional blower. A plurality of boiling electrodes 48 are disposed within the boiling tank 46 and spaced apart from each other by slots 50 formed at the lower portion of the side walls 52 of the boiling tank 46. A horizontally disposed tab 54 having an aperture therein is formed at one top corner of each of the boiling electrodes 48. A pair of buss bar members 56 are provided for carrying current to the boiling electrodes 48. Each of the bus bar members 56 is bolted to the boiling electrode tabs 54 of alternate boiling electrodes 48 via a bolt 58 and nut 60 as shown in FIG. 4. Sheet metal screws (not shown) could be used instead of the bolts 58 and nuts 60. It should be noted that a notch 62 is provided at one lower corner only of each of the boiling electrodes 48. It should be further noted that the slots 50 formed in the side walls 52 extend downwardly to one of two alternate depths. The short slots 64 are configured to mate with the edge 68 of the boiling electrode 48 having the notch 62. Conversely, the long slots 66 are configured to mate with the unnotched edges 69 of the boiling electrodes 48. This configuration insures that only alternate ones of the boiling electrodes 48 will be connected to the same bus bar member 56. A pair of slots 70 are formed at the top inner surface of the front wall 72 of reservoir drawer assembly 14. The slots 70 are provided to receive the upwardly directed tabs 74 of the buss bar members 56. The rearwardly projecting contacts 76 formed at the top front of the bus bar members 56 are provided for electrical connection to contact clips 78 shown in FIG. 11 upon full insertion of the boiling reservoir tank 14 into the drain tank 16 as illustrated in FIG. 5.

FIGS. 5 and 6 illustrate the configuration of the boiling reservoir assembly 14 secured within the drain tank 16. The drain floor 80 of the drain tank 16 slopes downwardly from the rear drain wall 82 toward a front drain trough 84. A drain outlet 44 is formed in the floor 86 of the trough 84. A lip 88 extends upwardly from the floor 86 to receive the lower edge of the interlock plate 20.

A U-shaped siphon tube 90 extends from the floor 92 of the reservoir tank of the boiling tank 46 through a central vertical tank wall 94 and downward outside the boiling tank 46 to a position disposed immediately above the floor 80 of the drain tank 16. A grommet 96 seals the outer surface of the siphon tube 90 with the central vertical reservoir wall 94 which divides the boiling tank 46 from the drain compartment 47 of the reservoir drawer assembly 14. The siphon inlet 98 is disposed at an angle to prevent the inlet from inadvertently sealing against the reservoir floor 92 in the event the leg 100 of the siphon tube 90 located within the boiling tank 46 should inadvertently slip downward. The angled opening 98 also insures that a small amount of water remains in the bottom of the boiling tank 46 after a flush/drain operation which will be explained in detail. Rails 102 extend upward from the drain floor 80 to support the reservoir floor 92 in a substantially horizontal position. A conventional drain hose (not shown) may be secured about the drain outlet 44. A drawer handle 15 is provided on the reservoir tank front wall 72 to assist in the manual removal of the reservoir assembly 14 from the drain tank 16 for maintenance and the subsequent reinsertion therein.

FIGS. 7-9 illustrate the sequence of steps in the removal of the reservoir assembly 14 from the drain tank 16 for maintenance. First, two interlock screws 104 disposed at the top of the metal interlock plate 20 must be unscrewed. The interlock screws 104 are connected in series via the metal interlock plate 20 with one of the interlock screws 104 connected to ground via the metal mounting plate 18 and the other connected to am interlock terminal 428 (FIG. 12b) on the circuit board assembly 26 but insulated from the grounded metal mounting plate 18 to electrical ground. Immediately upon removal of the first of either the interlock screws 104, the ground connection is broken as will be explained hereinafter in the description of the electronic control section 12. As will be explained in greater detail hereinafter, this results in an automatic flush and drain cycle whereby cold water is added to the boiling water in the boiling tank 46 for a predetermined time period resulting in an automatic flush and drain operation. The interlock plate 20 must be removed to provide access to two lower drawer interlock screws 106. The lower drawer interlock screws 106 from FIG. 8 then must be removed to permit the reservoir assembly 14 to be manually withdrawn from the drain tank 16 with the aid of drawer handle 15. FIG. 9 illustrates the drain tank 16 with the reservoir drawer 14 completed removed. Removal of the reservoir drawer 14 is occasionally necessary to remove accumulated mineral deposits from the boiling electrodes 48 or to replace the boiling electrodes 48 which may become worn after an extended period of use. When maintenance on the reservoir assembly 14 has been completed, it is reinstalled in the drain tank 16, lower drawer interlock screws 106 inserted through the front wall 72 and screwed into keystone spacers secured to the mounting plate 18 are reinstalled. Then the lower edge of the interlock plate 20 is inserted inside the lip 88 of the drain tank 16 and secured at the front wall 72 of the reservoir drawer assembly 14 via upper interlock screws 104 which are inserted through the front wall 72 and screwed into keystone spacers secured to the mounting plate. The keystone spacers which receives the mounted screw 104 connected to the interlock terminal 428 are electrically insulated from the mounting plate by the back wall of the raceway housing 28. Both interlock screws 104 must be reinstalled in order to reestablish the connection to ground.

Figure 12A:
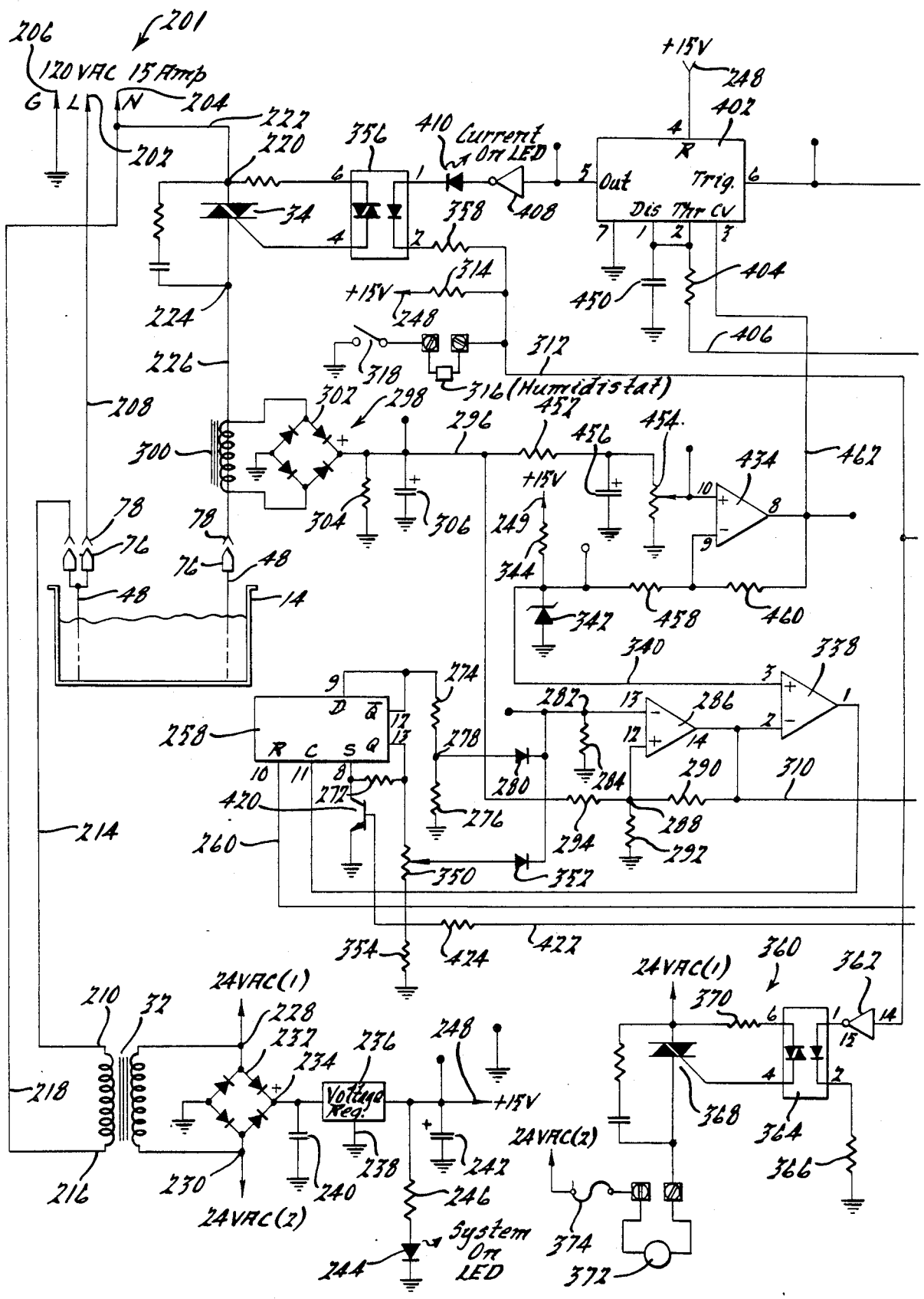

FIGS. 12a and 12b together comprise the schematic circuit diagram of the electronically controlled steam humidifier 10 of the present invention. A conventional grounded AC power cord 201 provides 120 volt 60 Hz AC power to terminals 202 and 204 on the circuit board assembly 26. Terminal 206 is connected to ground, i.e., to the metal mounting plate 18. Terminal 202 is electrically connected to one of the contact clips 78 (FIG. 11) by line 208. 120 volt AC power also is provided to one terminal 210 of the primary winding of a 24 volt AC transformer 32 which in turn is connected via a line 214, bus bar contacts 76, tank contact clips 78 and line 208 to terminal 202. The other end terminal 216 of the primary winding of transformer 32 is connected directly to terminal 204 via line 218.

A main terminal 220 of triac 34 is also connected to terminal 204 via line 222. The other main terminal 224 is in turn electrically connected to the remaining bus bar contact 76 via the remaining contact clip 78 and line 226. This arrangement provides 120 volt AC power to the boiling electrodes 48 of the boiling tank 46 of reservoir assembly 14.

The secondary winding of transformer 32 provides 24 volt AC (1) and 24 volts AC (2) at terminals 228 and 230, respectively, which in turn are connected across the AC terminals of a diode bridge 232. Positive terminal 234 of the diode bridge 232 in turn is connected to the input of a three terminal positive fixed voltage regulator 236 such as an MC7815CT. A common ground 238 is provided between the input and output terminals of the voltage regulator 236. Capacitor 240 provides added stability at the input of the voltage regulator 236 while capacitor 242 is provided at the output of the voltage regulator 236 to improve transient response. An LED 244 is also coupled to the output of voltage regulator 236 via resistor 246 to indicate a "System On" condition whenever the power cord 201 is plugged into a 120 volt AC outlet (not shown) and the reservoir drawer assembly 14 is fully inserted into the drain tank 16 whereby the bus bar contacts 76 are engaged by their corresponding spring loaded contact clips 78. Thus, a regulated +15 volt DC source is provided at output terminal 248 for use by the various logic circuitry of the electronic control section 12.

A Power On Reset Signal Generator 249 is formed by a capacitor 250, resistor 252 and OR gate 254. Capacitor 250 is connected between a node 256 and the +15 volt DC source from terminal 248. Resistor 252 is connected between node 256 and ground. Node 256 is connected to the input on pin 4 of OR gate 254. Capacitor 250 pulls a high current in order to charge. As a result, the high logic level signal appearing at pin 4 of OR gate 254 falls to ground within a few microseconds. The output at pin 6 of OR gate 254 is high only while a high appears at its input pin 4 since a low signal appears at its input 3. This very short duration Power On Reset pulse at the output of OR gate 254 is fed to the reset input R on pin 10 of a type D FLIP-FLOP 258 via line 260 and to the reset input R on pin 4 of another type D FLIP-FLOP 262 via line 260 and to the reset inputs R at pins 7 and 15 of dual binary up counters 266 and 268, respectively and further to the reset input R at pin 11 of a 14-bit binary counter 270.

Upon receipt by the FLIP-FLOP 258 at its reset input R of the Power On Reset pulse, a high appears at its Q/ output at pin 11 which in turn is fed back to its D input at pin 9 thereby latching its Q/ output high. Also, the Q output of FLIP-FLOP 258 becomes low. The high Q/ output of FLIP-FLOP 258 also is fed to a voltage divider circuit formed by resistors 274 and 276. The result is a +4.5 volt signal appearing at node 278 which in turn is fed via diode 280 to node 282. A resistor 284 is coupled between node 282 and ground. A +4.0 volt signal thus is provided to the negative input of operational amplifier 286 at its input pin 13. The positive input of operational amplifier 286 at its input pin 12 is connected to node 288. The output at pin 14 of the operational amplifier 286 is fed back to node 288 via resistor 290. A resistor 292 is connected between node 288 and ground and a resistor 294 is connected between node 288 and line 296 which in turn is connected to the output of a current detector circuit 298. The current detector circuit 298 comprises a current transformer 300, a diode bridge 302, resistor 304 and capacitor 306. The terminal ends of the winding of current transformer 300 are connected across the AC input of diode bridge 302. Resistor 304 and capacitor 306 are connected in parallel between the positive output of diode bridge 302 and ground.

The fill valve 40 is initially in an off condition during initial application of power to the system. Therefore, there is no water in the boiling tank 46 of reservoir 14 and there is zero current flowing to the boiling electrodes 48. The current detector circuit 298 is configured to provide positive DC voltage on line 296 in direct correspondence with the current sensed through line 226 via current transformer 300. Each amp of current sensed on line 226 by transformer 300 will result in approximately one volt DC on line 296, i.e., 11 amps sensed on line 226 will result in approximately +11 volts DC on line 296. With no water in the reservoir tank 14, zero current is flowing on line 226 resulting in zero voltage appearing on line 296 from the output of current detector 298.

Accordingly, the output of operational amplifier 286 at its pin 14 will be near ground as a result of the voltage at its positive input on pin 12 being less than the +4.0 volt DC appearing at its negative input on pin 13. The output on pin 14 of operational amplifier 286 is fed to one of three inputs of OR gate 308 at its pin 12 via line 310. The signal on line 310 is designated as a VALVE CONTROL signal. Thus, with no water in the reservoir tank 14, the VALVE CONTROL signal on line 310 is low. Input pin 13 of OR gate 308 is connected to line 312 which carries a HUMIDISTAT CONTROL signal. A resistor 314 is connected between line 312 and the +15 volt DC source of terminal 248. Also connected to line 312 is one terminal of a humidistat 316 which may be mounted on either an air return duct (not shown) of the air conditioner/furnace system. The other terminal of humidistat 316 is connected to ground through an optional system switch 318. Thus when the humidistat 316 senses that additional humidity is required, the humidistat 316 closes to provide a circuit path to ground for line 312. Thus, a low HUMIDISTAT CONTROL signal appearing on line 312 indicates that additional humidity is required. Otherwise, a high HUMIDISTAT CONTROL signal appears on line 312 indicating no additional humidity is required. When the system is initially energized, it is presumed that humidity is required and a low HUMIDISTAT CONTROL signal will appear on line 312 and at input pin 13 of OR gate 308. The remaining input 11 of OR gate 308 is coupled via lines 320 and 400 to the Q output at pin 1 of FLIP-FLOP 262. It should be rememberd that FLIP-FLOP 262 previously was reset by a POWER ON RESET pulse on line 264 which resulted in its Q output at pin 1 becoming low. Thus, when the system is initially energized and the humidistat 316 is closed, a low signal will appear at all three inputs 11, 12 and 13 of OR gate 308. A low signal will therefore appear at the output pin 10 of OR gate 308 which is connected to input pin 6 of AND gate 322 whose output on pin 4 is therefore low. The output of AND gate 322 is fed via resistor 324 to a cathode input on pin 2 of an optically isolated triac driver 326 whose anode input on pin 1 is connected to the +15 volt source at terminal 248 via an LED "FILL VALVE ON" indicator light. The triac driver 326 is thus energized by the low at its input pin 2 which turns on triac 330 whose gate electrode is connected to output pin 4 of triac driver 326. One of the main terminals of triac 330 is connected to the output pin 6 of triac driver 326 via resistor 332 and also to the 24 VAC (1) at terminal 228. The other main terminal of triac 330 is connected to one end terminal of solenoid fill valve 40. The other terminal of solenoid fill valve 40 is connected to the 24 VAC (2) at terminal 230. A snubber network comprising a resistor 334 in series with capacitor 336 is connected across the main terminals of triac 330 to allow the triac 330 to remain at stable "on" and "off" states. A snubber network similarly is provided for triacs 34 and 368.

With the solenoid fill valve 40 thus energized, water will begin to flow through the fill tube 38 into the boiling tank 46 of reservoir tank 14. As water fills the boiling tank 46 a current path is established between boiling electrodes 48 and current begins to flow on lines 208 and 226. As the water rises covering larger areas of the boiling electrodes 48 the current flow increases. This increase is sensed by the current transformer 300 resulting in an increase of DC voltage on line 296 at the output of current detector 298. Thus the voltage at node 288 which appears at the positive input pin 12 of operational amplifier 286 also increases. When the voltage at pin 12 exceeds the reference on line 282 provided from the voltage divider node 278, then a positive voltage appears at the output pin 14 of operational amplifier 286. The output from pin 14 of operational amplifier 286 is fed to the negative input on pin 2 of an operational amplifier 338 and is also fed back through resistor 290 to node 288 which acts a Schmidt trigger to effect an "on/off" current change hysteresis. A reference voltage of approximately 7.5 volts DC is fed to the positive input pin 3 of operational amplifier 338 via line 340 which in turn is connected between the cathode of zener diode 342 and resistor 344. The anode of zener diode 342 is grounded and resistor 344 is connected between the +15 volt source at terminal 248 and line 340.

When the voltage at pin 2 of operational amplifier 338 exceeds the reference voltage of 7.5 volts at its pin 3, the output on pin 1 of operational amplifier 338 becomes low. The output on pin 1 is fed back to the clock input C on pin 11 of FLIP-FLOP 258. The high voltage VALVE CONTROL signal which appears at pin 14 of operational amplifier 286 is also fed via line 310 to input pin 12 of OR gate 308 whose output on pin 10 in turn becomes high. This results in a high on the input pin 6 of AND gate 322 which already has a high signal at its other input pin 5 as a result of a low signal on line 320 appearing at pin 12 of AND gate 346 having a low on its output pin 11. The low output on pin 11 of AND gate 346 is inverted by inverter 348. The high signal at output pin 2 of inverter 348 is fed to input pin 5 of AND gate 322 whose output on pin 4 becomes high. When the AND gate 322 output becomes high, triac driver 326 is de-energized thereby turning off triac 330 which in turn shuts off solenoid fill valve 40.

The current flowing through the water from the boiling electrodes 48 quickly heats the water to its boiling point. As water boils off, the water level in the boiling tank 46 of reservoir 14 drops causing a decrease in current flow through lines 208 and 226. This decrease in current flow is sensed by current detector 298 and results in decreased voltage appearing at input pin 12 of operational amplifier 286. When this voltage falls below the 4.0 reference voltage at pin 13, then output pin 14 of operational amplifier 286 falls to near ground. The resulting low VALVE CONTROL signal on line 310 appears at input pin 12 of OR gate 308. Since a low still appears at input pin 11 and also a low appears at input pin 13 of OR gate 308 with the humidistat 316 closed, then a low which results at the output of OR gate 308 causes the output of AND gate 322 to become low which in turn results in the fill valve 40 being energized via triac driver 326 and triac 330 as previously explained.

This causes additional water to be added to the boiling tank 46 of reservoir 14 via fill tube 38.

At the same time, the low signal at input pin 2 of operational amplifier 338 results in its output pin 1 becoming high. The resulting low to high transition signal at the clock input C at pin 11 of FLIP-FLOP 258 causes it to change state. Thus, its Q/ output at pin 12 which had been high now becomes low and the Q output at pin 13 which had been low now becomes high. The low Q/ output at pin 12 of FLIP-FLOP 258 removes the +4.5 volt reference from line 282 provided from node 278 via diode 280. Conversely, the high Q output at pin 13 of FLIP-FLOP 258 is provided to line 282 via potentiometer 350 and diode 352. Potentiometer 350 is connected between resistor 272 and resistor 354. Thus, a higher voltage level of approximately 11–11.5 volts becomes the reference voltage on line 282 for the negative input at pin 13 of operational amplifier 286. Potentiometer 350 permits adjustment of the operating current threshold. When sufficient water has been added to the boiling tank 46 of reservoir 14, the current to the boiling electrodes 48 will rise to approximately 11 amps. This will be sensed by current detector 298 resulting in 11 volts DC appearing on line 296 and further results in sufficient positive voltage to appear at input pin 12 of operational amplifier 286 that a high VALVE CONTROL signal is generated by its output on line 310 which shuts off fill valve 40 as previously explained. When sufficient water boils off that the current to the boiling electrodes 48 drops to approximately 10.5 amps then the voltage on pin 12 of operational amplifier 286 falls below the reference voltage at its pin 13. When this occurs, the resulting low VALVE CONTROL signal on line 310 causes the fill valve 40 to again be energized provided the humidistat switch 316 is closed and a low HUMIDISTAT CONTROL signal is present on line 312 indicating a need for additional humidity.

The fill valve 40 will continually be cycled on and off in response to the operation of operational amplifier 286 with the higher voltage reference provided by diode 352 and potentiometer 350.

It is important to provide a two stage current start up as described above in order to accomodate for variations in both the temperature and hardness of the tap water added to boiling tank 46 of reservoir 14. Cold water is not as conductive as hot water. Thus, if cold water as initially provided into the boiling tank 46 was permitted to carry 11 amps, then after it was heated and became more conductive, the current could rise to 25 amps or greater creating an extremely excessive current condition. On the other hand, soft water is not as conductive as hard water. Without the two stage current start up, if soft water were added to the boiling tank 46 of reservoir 14, it is possible that an overflow condition could result before the current to boiling electrodes 46 could increase enough to generate a low VALVE CONTROL signal to shut off the fill valve 40.

It should be noted that when the Q output of FLIP-FLOP 258 becomes high on pin 13, that this high signal is fed back to the set input S on its pin 8 via resistor 272. This feedback prevents toggling of the Q and Q/ outputs of FLIP-FLOP 258 in response to receipt of a clock signal at its clock input C on pin 11, which toggling would cause two stage current start up circuit to return to the low current start up mode of operation.

During the normal operation of the humidifier 10 after the previously described initial start up, the triac 34 controls the supply of current to the boiling plate electrodes 48 in response to the humidistat 316 and triac driver 356. When the humidistat 316 opens, then the voltage across resistor 314 resulting in a high HUMIDISTAT CONTROL signal is applied to cathode input pin 2 of the triac driver 356 via resistor 358. This high HUMIDISTAT CONTROL signal appearing at input pin 2 of the opto coupler 356 causes it to be de-energized which turns off triac 34 and precludes current flow to the boiling electrodes 48 thereby stopping the generation of steam. Also when a high HUMIDISTAT CONTROL signal appears on line 312 as a result of the humidistat 316 opening, then the resulting high at input pin 13 of OR gate 308 causes a high at its output pin 10 to appear in turn at input pin 6 of AND gate 322 whose output at pin 4 in turn becomes high. This results further in a high signal at cathode input pin 2 of triac driver 326 which in turn shuts off triac 330 de-energizing solenoid fill valve 40 and preventing the addition of water to the boiling tank 46 of reservoir 14.

The HUMIDISTAT CONTROL signal on line 312 also controls the operation of a blower interface circuit 360 which has an input at pin 14 of inverter 362 connected to line 312. The inverted output at pin 315 of inverter 362 is fed to the anode input on pin 1 of triac driver 364. A resistor 366 is connected between ground and cathode input pin 2 of triac driver 364. The output pin 4 of triac driver 364 is connected to the gate electrode of triac 368. The output pin 6 of driver 364 is connected to a main terminal of triac 368 via resistor 370 which main terminal is connected to the 24 VAC (1) at terminal 228. When triac 368 is turned on it provides 24 volt AC to a blower relay 372. Fuse 374 is provided to protect the blower relay 372. Thus in response to the triac driver 364 being energized as the result of a low HUMIDISTAT CONTROL signal on line 312, an air conditioner/furnace blower motor can be turned on via blower relay 372.

Mineral deposits tend to accumulate within the boiling tank 46 of reservoir 14 and form deposits on the boiling electrodes 48. An important aspect of the present invention is a flush/drain system which operates to flush the boiling tank 46 of reservoir 14 and boiling electrodes 48 with a supply of fresh tap water. At the beginning of a flush/drain operation, the fill valve 40 is energized for a sufficient period of time, i.e., one minute that the water level in the boiling tank 46 of reservoir 14 rises to the top of the siphon tube 90 (FIGS. 5 and 6). This initiates an automatic self-siphoning of the water from the boiling tank 46 of the reservoir 14. During the siphon operation, discharge water flows into the angled inlet 98 of leg 100 of the siphon tube 90 and out the discharge opening 99 of the drain leg 101 of the siphon tube toward the downwardly sloping floor 80 of drain tank 16 into the drain trough 84 and out the drain outlet 44 into a conventional drain tube (not shown) which may be attached thereto. The siphon drain operation will continue to discharge water until the water level in the boiling tank 46 is siphoned down to the angled inlet 98 of leg 100. This requires a certain amount of time, i.e., 40 to 45 seconds after the fill valve is de-energized stopping the addition of fresh water to the boiling tank 46 of reservoir 14. The inner diameter of the siphon tube 90 (FIG. 5) in the preferred embodiment is ⅜ inches.

The electronic control section 12 of humidifier 10 includes circuitry which causes this flush/drain operation to occur at a predetermined interval of time of steam generation, i.e, every three hours of operation as measured by the accumulated time that a low HUMIDISTAT CONTROL signal appears on line 312 since the prior flush/drain operation. This regularly occurring flush/drain operation facilitates the removal of minerals from the boiling electrodes 48 and the inside walls of the boiling tank 46 of reservoir 14 while such minerals are still in solution before they have dried and crusted onto the electrodes 46 and such inside walls. The result is a significant reduction in maintenance requirements.

Referring again to FIGS. 12a and 12b, the timing control circuitry will now be described in more detail. As explained earlier, a POWER ON RESET pulse is generated by the power on reset pulse generator 249 and provided to the reset inputs of FLIP-FLOP 262 and dual binary up counters 266 and 278, and a 14-bit binary counter 270 via line 260. A pulse generator 376 is provided which may comprise one-half of an MC 3556 dual timing circuit configured to operate as a free running oscillator. A resistor 378 and capacitor 380 are connected to the Vcc input at pin 14 of pulse generator 376 to isolate it from the main power supply. Resistor 382, resistor 384 and capacitor 386 are connected in series between the +15 volt source and ground and determine the timing and width of the clock signals that are output from the output of the pulse generator 376 at its OUT pin 9. The TRIGGER input at pin 8 is tied to the THRESHOLD input at pin 12 and to a node 388 between the resistor 384 and capacitor 386. The control voltage CV input at pin 11 is connected to ground via capacitor 390.

Clock pulses are generated with this configuration at a frequency of approximately 1.2 seconds and are provided to the clock input C at pin 9 of counter 268 and also to input pin 9 of AND gate 392 from the output of pulse generator 376. Inverter 394, AND gate 392 and the 14 bit binary counter 270 comprise an operation timer which determines the length of time that the humidistat 316 switch is closed permitting current to be provided to the boiling electrodes to generate steam in the boiling reservoir 14 as indicated by the accumulated time a low HUMIDISTAT CONTROL signal appears on line 312. The HUMIDISTAT CONTROL signal on line 312 is low whenever the humidistat switch 316 and system switch 318 are closed calling for steam to be generated. This low HUMIDISTAT CONTROL signal is inverted by inverter 394 and provided to the input pin 8 of AND gate 392. The other input at pin 9 of AND gate 392 receives clock pulses output from pulse generator 376. The output at pin 10 of AND gate 392 is provided to the clock input C at pin 10 of counter 270. Thus, clock pulses are gated to the input of counter 270 via AND gate 392 from the pulse generator 376 only when a low HUMIDISTAT CONTROL signal is present on line 312. Counter 270 thus counts only the time of actual operation of humidifier 10. The Q14 output at pin 3 of counter 270 becomes high after approximately three hours of actual steam generation. The high Q14 output is provided to input pin 8 of OR gate 396. Input pin 2 of OR gate 396 is low as a result of the flush/drain switch 398 being closed and the interlock screws 104 connected to ground. A low appears at input pin 1 of OR gate 396 from the low Q output at pin 1 of FLIP-FLOP 262 on line 400 which resulted from the POWER ON RESET pulse received at the reset input R on pin 4 of FLIP-FLOP 262 from line 260. Thus, upon receipt of a high at input pin 8 of OR gate 386 its output at pin 9 changes from a low to a high and is in turn provided to the clock input C at pin 3 of FLIP-FLOP 262 which causes its Q and Q/ outputs to change state. The Q output at pin 1 of FLIP-FLOP 262 becomes high and the Q/ output at its pin 2 becomes low. This low Q/ output is fed to the THR threshold input at pin 2 of a pulse width modulator 402 through resistor 404 via line 406. This produces a high at the output of pin 5 of pulse width modulator 402 as will be explained hereinafter in further detail. This high at output pin 5 of a pulse width modulator 402 is inverted by inverter 408 providing a low signal to input pin 1 of opto coupler 356 causing it to be de-energized and in turn, shutting off triac 34 which in turn precludes current from flowing to the boiling electrodes 48. When the output of inverter 408 becomes low, the LED indicator 410 is turned off.

When the Q output of FLIP-FLOP 262 becomes high, it is fed back via line 400 to the pin 1 input of OR gate 396 to insure that its output at pin 9 remains high to prevent any further toggle of FLIP-FLOP 262 until a new POWER ON RESET pulse is generated on line 260. The high on line 400 is also provided to the enable inputs E on pins 2 and 10 of flush/drain counters 266 and 268, respectively. The high on line 400 is also provided to input pin 12 of AND gate 346 via line 400 along with being provided to input pin 11 of OR gate 308 via line 320. The low at the 4th stage output pin 5 of counter 266 is inverted by inverter 412 resulting in a high at input pin 13 of AND gate 346. Thus, the output of AND gate 346 becomes high, is inverted to a low by inverter 348 and provided as a low to input pin 5 of AND gate 322. This results in the output at pin 4 of AND gate 322 becoming low which engergizes the opto coupler 326 which turns on triac 330 and energizes a solenoid fill valve 40. Flush water is thus provided to reservoir 14 via fill tube 38 until the output of AND gate 322 becomes high.

Upo receipt of the high from the high Q output at pin 1 of FLIP-FLOP 262 on line 400 on their E enable inputs at pins 2 and 10, the flush/drain counters 266 and 268 are enabled to commence counting clock pulses received at the clock C input on pin 9 from the output of pulse generator 376. The 8th stage output provided at output pin 14 of counter 268 is fed to the clock input C at pin 1 of counter 266 via line 414. The 4th stage output of counter 266 appearing at its output pin 5 is provided to input pin 2 of AND gate 416 via line 418 and also to the pin 5 input of inverter 412. The 8th stage output at pin 6 of counter 266 is fed to both the pin 3 input of OR gate 254 and also to the base of transistor 420 via line 422 through resistor 424. The emitter of transistor 420 is grounded and its collector is connected to the set input S on pin 8 of FLIP-FLOP 258.

The solenoid fill valve remains energized and flush water continues to fill the reservoir 14 until the 4th stage output at pin 5 of counter 266 becomes high which occurs approximately 45 to 60 seconds after counters 266 and 268 have been enabled by a high on line 400. The high at output pin 5 of counter 266 is inverted by inverter 412 producing a low at input pin 13 of AND gate 346 whose output at pin 11 becomes low. This low output at pin 11 of AND gate 346 is inverted by inverter 348 and is fed as a high to input pin 5 of AND gate 322. Since there is a high at input pin 6 of AND gate 322 as a result of the high signal appearing on line 400 which produces, via line 320 connected to input pin 11 of OR gate 308, a high at the output of OR gate 308. The output at pin 4 of AND gate 322 becomes high, de-energizing triac driver 326, which turns off triac 330 and de-energizes the solenoid fill valve 40 which in turn stops the flow of flush water into the reservoir via fill tube 38, thus ending the flush portion of the flush/drain cycle. This 45 to 60 second time period corresponds to the time required for the water in the reservoir 14 to rise to the top of the siphon tube 90 to initiate a siphon and drain operation as previously described.

The 8th stage at output pin 6 of counter 266 becomes high approximately 45 to 60 seconds after its 4th stage becomes high. This corresponds to the time required for the water in the reservoir tank 14 to be siphoned down to the angled inlet 98 of leg 100 of the siphon tube 90. This high appearing at output pin 6 of counter 266, which occurs at the completion of the drain portion of the flush/drain cycle is fed to input pin 3 of OR gate 254 and also to the base of transistor 420 via line 422. Transistor 420 is thus turned on and provides a path for ground at the set input S at pin 8 of FLIP-FLOP 258 thereby unlatching the FLIP-FLOP 258 set input S. The high at output pin 6 of OR gate 254 resulting from the high at its input pin 3 is fed via line 260 to the reset input R at pin 10 of FLIP-FLOP 258 as well as to the R reset inputs of FLIP-FLOP 262, operation timer 270 and flush/drain timers 266 and 268. This clears the outputs at both output pins 5 and 6 of counter 266 which results in a low signal on lines 418, 422 and 260. The low signal on line 422 turns off transistor 420. The reset pulse received at the reset input R of FLIP-FLOP 262 causes it to change state whereby its Q/ output at pin 2 goes from a low to a high and its Q output at pin 1 goes from a high to a low. The high Q/ output of FLIP-FLOP 262 is fed via line 406 to the THR threshold input at pin 2 of pulse width modulator 402 which reactivates triac 34 via triac driver 356 allowing current again to flow to boiling electrodes 48. The low Q output on pin 1 of FLIP-FLOP 262 is fed via line 400 to the E enable inputs of the flush/drain timers 266 and 268 inhibiting their being incremented upon receipt of clock pulses at input pin 9 of counter 268. The low appearing on line 400 from the Q output of FLIP-FLOP 262 is fed to the pin 12 input of AND gate 346 causing its output at pin 11 to go low which in turn is inverted by inverter 348 and appears as a high at input pin 5 of 322. This effectively removes the timing circuitry from affecting fill valve operations which become controlled by the logic level of the signal at input pin 6 of AND gate 322 due to the high at its input pin 5. Also, the low on line 400 is fed to input pin 11 of OR gate 308 which permits it to respond to either the HUMIDISTAT CONTROL signal on line 312 or the VALVE CONTROL signal on line 310. The VALVE CONTROL signal on line 310 fed to pin 12 of OR gate 308 is low due to the lack of current flow resulting from the water having been siphoned from the boiling tank 46 of reservoir 14. Therefore, when the humidistat 316 switch closes generating a low HUMIDISTAT CONTROL signal on line 312, the output of OR gate 308 at its pin 10 goes low. This low is fed to the input at pin 6 of AND gate 322 resulting in a low at its output pin 4 which energizes the triac driver 326, turning on triac 330 and fill valve 40 thereby commencing a new fill operation. FLIP-FLOP 258 has already been conditioned for a new two-stage current start up operation as previously described.

Figure 10:
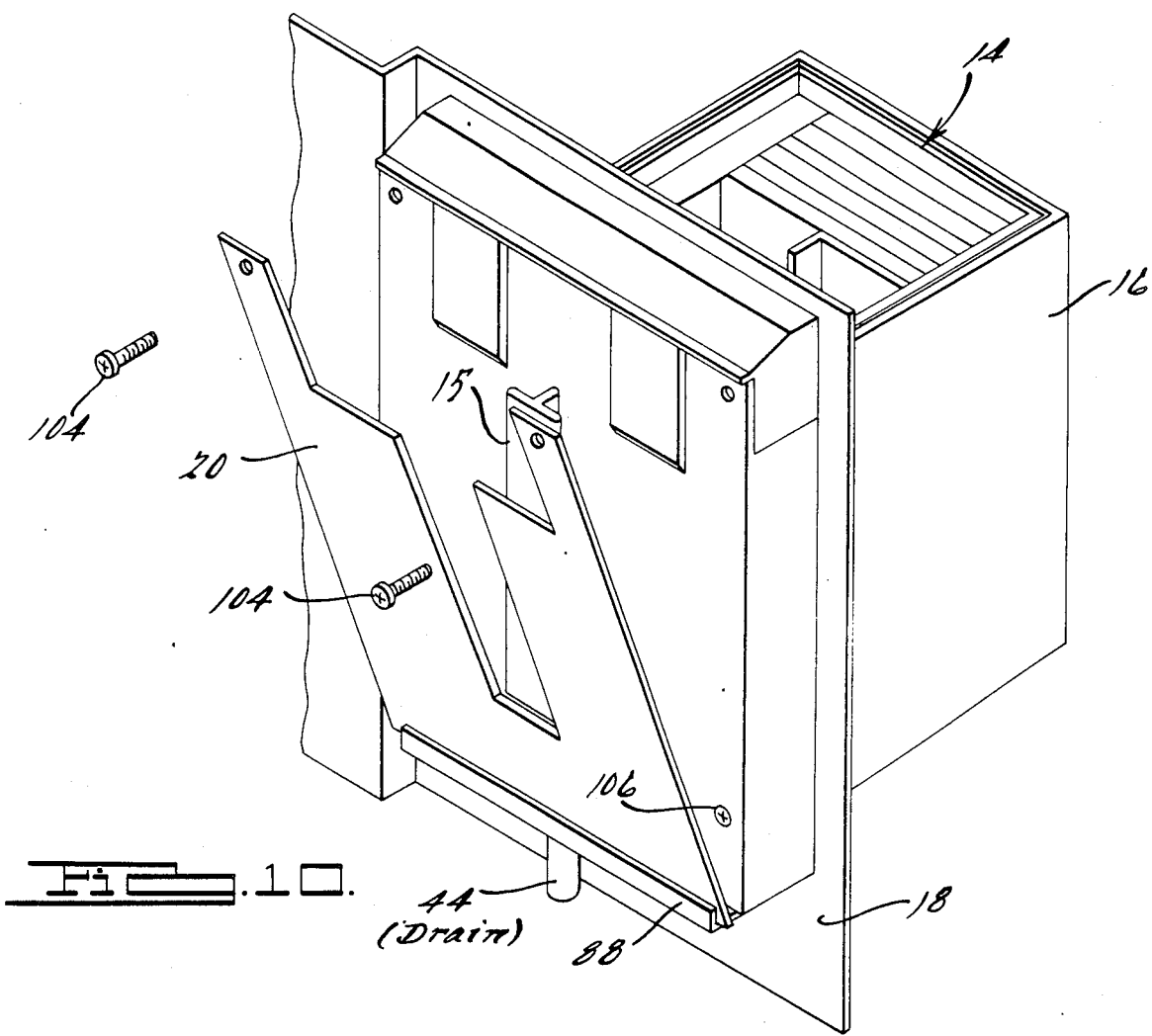
FIG. 10 is a fragmentary front perspective view illustrating reassembly of the interlock plate and interlock screws of the humidifier of FIG. 1.

When maintenance is to be performed on the boiling reservoir 14, the interlock plate 20 must first be removed as illustrated in FIGS. 7–9. As soon as either one of the interlock screws 104 is loosened, removing the ground connection from node 428, a flush/drain cycle is immediately initiated. With the connection to ground broken by loosening of one of the interlock screws 104, a high appears at node 428 from the +15 volt source via resistor 430 connected thereto. The high at node 428 is fed to the set input S at pin 6 of FLIP-FLOP 262. The high at node 428 also is fed to the pin 2 input of OR gate 396. The resulting high on output pin 9 of OR gate 396 which in turn is fed to the clock input C at pin 3 of FLIP-FLOP 262 causes the Q and Q/ outputs to change state. The Q output of FLIP-FLOP 262 changes from a low to a high and the Q/ output from a high to a low. FLIP-FLOP 262 is latched in this state until the high is removed from the set input S at its pin 6 by reinstalling both interlock screws 104. This high signal on line 400 from the high Q output of FLIP-FLOP 262 produces a high at the output pin 11 of AND gate 346 and is inverted by inverter 348 producing a low at input pin 5 of AND gate 322 causing its output at pin 4 to become low and initiating a flush operation. The high at node 428 is also fed to the input pin 1 of AND gate 416. This conditions AND gate 416 to respond to a high signal at its input pin 2 when output pin 5 of counter 266 becomes high at the time that the fill operation has been completed, which results in self-siphoning to commence as previously described. Since a high appears at both inputs 1 and 2 of AND gate 416, its output at pin 3 becomes high which is inverted by inverter 432 and appears as a low at the reset input R on pin 10 of pulse generator 376 thereby stopping the pulse generator 376. This prevents the flush/drain counters 266 and 268 from continuing to increment and thereby insures that a new fill operation will not commence until the interlock screws 104 have been properly reinstalled as shown in FIG. 10 re-establishing a connection to ground at node 428. After both interlock screws 104 have been completed removed, the interlock plate 20 may be removed providing access to interlock screws 106 (FIG. 8) which must both be unscrewed in order to manually pull the reservoir drawer assembly 14 out of the drain tank 16 with the aid of handle 15. When the reservoir drawer 14 has been removed, the circuit connection between buss bar contacts 76 and contact clips 78 is broken thereby shutting off power from the entire system.

After desired maintenance has been completed on the reservoir drawer assembly 14, it is reinstalled in the drain tank 16 with the buss bar contacts 76 inserted through champered openings 29 into full contact with their corresponding contact clips 78 thereby restoring power to the system. When power is restored, a new POWER ON RESET pulse is generated via power on reset pulse generator 249. This starts a new fill operation and two stage current start up operation as described previously.

The interlock screws 106 are reinstalled as shown in FIG. 8. Then the interlock plate 20 is reinstalled as shown in FIG. 10. Then, only after both interlock screws 104 have been fully screwed into place is ground re-established at node 428 producing a low signal at input pin 2 of OR gate 396 and at input pin 1 of AND gate 416 whose output at pin 3 becomes low which in turn is inverted by inverter 432 providing a high at the reset input R on pin 10 of pulse generator 376 which recommences pulse generation at its output pin 9. The interlock plate 20 and interlock screws 104 must be reinstalled in order for the electronic steam humidifier 10 to operate.

The present invention further includes overcurrent control circuitry which maintains a fixed average current to the boiling electrodes 48 under conditions which otherwise may result in excessive current flowing to the boiling electrodes 48. This overcurrent circuitry comprises operational amplifier 434, pulse width modulator 402 and zero crossing detector 436. The zero crossing detector 436 includes diode bridge 438. 24 volts AC are provided through the AC terminals of diode bridge 438. This is lowered by resistors 440, 441 and 442 to approximately 10 volts peak. Resistors 444 and 446 form a voltage divider which results in approximately 0.85 volts DC at the negative input on pin 6 of operational amplifier 448. Thus, negative going pulses are produced at pin 7 of operational amplifier 448 which are of short duration and occur as the sign wave appearing on the positive input at pin 5 of operational amplifier 448 crosses zero. The pulses output from the zero crossing detector 436 are fed to the TRIG trigger input at pin 6 of pulse width modulator 402. The time period of pulse width modulator 402 is determined by capacitor 450 and resistor 404 as modulated in accordance with the voltage appearing at the CV control voltage input pin 3 of pulse width modulator 402 from the output pin 8 of operational amplifier 434. A +7.5 volt reference is provided to the negative input at pin 9 of operation amplifier 434. The output of the current detector 298 appearing on line 296 is fed to the positive input pin 10 of operational amplifier 434 via resistor 452 and maximum current potentiometer 454 which is connected in parallel with capacitor 456. Potentiometer 454 is adjusted so that the output of operational amplifier 434 at its output pin 8 begins to rise above 1.2 volts when the voltage at its input pin 10 exceeds approximately 7 volts. Operational amplifier 434 has a gain of approximately 10 as determined by resistors 458 and 460. The output of operational amplifier 434 is provided via line 462 to the CV control voltage input at pin 3 of pulse width modulator 402. Thus, as the output of the current detector circuit 298 on line 296 increases, such as during an excessive current condition, to a high enough level that the voltage rises on line 462 and at the CV input pin 3 of pulse width modulator 402. This causes the pulses output from pulse width modulator 402 to become further apart thereby de-energizing triac driver 356 which in turn turns off triac 34 for a greater portion of the 60 cycle period thereby lowering the average current provided to boiling electrodes 48. Conditions which could result in excessive current such as 14 or 15 amps would be unusually salty water or an unusually large amount of water added to the reservoir 14 due to high water pressure.

If desired, a flow restrictor (not shown) of approximately 0.045 inch diameter hole could be inserted at the outlet of fill tube 38 to prevent overfilling the boiling tank 46 of reservoir 14 due to high water pressure.

Variation and modifications of the present invention are possible without departing from the scope and spirit as defined in the appended claims.

I claim:

1. A steam humidifier comprising a boiling tank, an electronically controlled fill valve for providing water to the boiling tank, a plurality of boiling electrodes disposed within the boiling tank for conducting current from an AC source through the water for generating steam, electrode switching means for selectively connecting an AC source to said boiling electrodes, a current detector for sensing the magnitude of current flowing to the boiling electrodes, an electronic valve control circuit connected to the current detector and the fill valve for actuating the fill valve to automatically replenish water boiled from the boiling tank in response to a decrease in the magnitude of current sensed by the current detector, means for producing a steam operation control signal while the humidifier is operating in a steam generation mode, first timer means coupled to said control signal producing means for accumulating an indication of the total time that said control signal is produced and for generating a first timer output signal indicative of a predetermined accumulated time of operation of the humidifier in a steam generation mode; said electrode switching means coupled to said first timer means and responsive to said first timer output signal for preventing the flow of current to said boiling electrodes, second timer control means coupled between said first timer means and said fill valve, said second timer control means responsive to said first timer output signal for actuating said fill valve for a predetermined flush time period corresponding to the time required to flush the boiling tank; and means in communication with said boiling tank and operative during the flush period for draining from said boiling tank water added thereto by said fill valve during said flush period.

2. The steam humidifier of claim 1 wherein said second timer control means de-actuates said fill valve after said flush time period and maintains said fill valve de-actuated for a predetermined drain time period corresponding to the time required for the drain means to drain water from the boiling tank added thereto by the fill valve during the flush period.

3. The steam humidifier of claim 2 wherein said drain means comprises a substantially U-shaped siphon tube having one open end disposed adjacent the bottom of said boiling tank and extending upward, the top of the siphon tube being disposed at a height above the highest water level in the boiling tank during normal steam generation, the other open end of said siphon tube extending downward outside said boiling tank, the duration of said predetermined flush time period corresponding to at least the time required for said actuated fill valve to add sufficient water to the boiling tank to raise the water level therein to the top of the siphon tube thereby initiating a siphon operation whereby the water in the tank is siphoned out of said boiling tank.

4. The steam humidifier of claim 3 wherein said predetermined drain time period corresponds to at least the time required to siphon water from the boiling tank to a level below the top of the siphon tube.

5. The steam humidifier of claim 3 wherein said boiling tank is formed in a reservoir drawer unit adapted to be readily removed from said steam humidifier.

6. The steam humidifier of claim 5 further comprising a drain tank having an opening formed in a front portion thereof for receiving said removable reservoir drawer unit, said drain tank having a floor which slopes downward from a rear portion toward said front portion, rails projecting up from said drain floor to support said reservoir drawer unit in a substantially horizontal position, a trough at the front portion of said drain floor, and a drain tube outlet formed at the bottom of the trough, said drain tank adapted to receive water from said other open end of said siphon tube during said siphon operation.

7. The steam humidifier of claim 6 further comprising an interlock mechanism adapted to removably secure said reservoir drawer unit within said drain tank.

8. The steam humidifier of claim 7 further comprising interlock circuit means electrically responsive to removal of the interlock mechanism to enable said second timer control means for actuating said fill valve for said predetermined flush time period corresponding to the time required for said fill valve to add sufficient water to the boiling tank to initiate said siphon operation.

9. The steam humidifier of claim 1 further comprising blower control circuit means coupled to said steam operation control signal producing means for energizing a blower relay while said steam operation control signal is produced.

10. The steam humidifier of claim 1 further comprising:
    comparator means connected to said current detector for comparing said sensed current flow to a reference current level and producing a first comparator output signal when said measured current flow is less than said reference current level and a second comparator output signal when said measured current flow is equal to or greater than said reference level;
    said comparator means coupled to said electronic valve control circuit for energizing said fill valve to add water to said boiling tank in response to said first comparator output signal and de-energizing said fill valve in response to said second comparator output;
    reference level determining means connected to said comparator means for establishing said reference current level at a first predetermined level during an initial operation of said fill valve; and
    means connected to said reference level determining means and said comparator means for changing said reference current level from said first predetermined level to a second predetermined level which is higher than said first predetermined level after an initial operation of said fill valve.

11. A steam humidifier including a boiling tank, an electronically controlled water fill valve for providing water to the boiling tank, a plurality of electrodes disposed within the boiling tank for conducting current from an AC source through the water in the boiling tank for generating steam, means for measuring the level of current flow through said electrodes, and electronic control means responsive to said current level measuring means for cyclically actuating and de-actuating the fill valve to add water to said boiling tank when said measured current is below a desired level, said electronic control means having means for establishing a predetermined initial current level and a predetermined operating current level which is higher than the predetermined initial current level, means for detecting said initial fill cycle, and means responsive to said detected fill cycle for changing the operation of said electronic control means from said predetermined initial current level to said higher predetermined operating current level thereby providing for said electronic control means to operate in an initial fill cycle to de-actuate the fill valve in response to said measured current reaching the predetermined initial current level corresponding to a desired current level for the initial fill cycle and to operate in subsequent fill cycles to de-actuate the fill valve in response to said measured current reaching the predetermined operating current level which is higher than said predetermined initial current level.

12. The steam humidifier of claim 11 further comprising comparator means responsive to said current level measuring means for comparing the magnitude of measured current flow to a predetermined maximum current level, said comparator means producing an output which corresponds to the magnitude that the measured current exceeds a predetermined maximum current level;
    zero crossover detector means responsive to said AC source for generating a pulse train in accordance with the zero crossings of the AC source;
    pulse width modulation means responsive to said comparator output for pulse width modulation of said pulse train in accordance with said comparator output; and
    electrode switching means for selectively connecting said AC source to said electrodes, said electrode switching means responsive to said pulse width modulation means for lowering the average current flow to said boiling electrodes to said predetermined maximum current level.

13. A steam humidifier including a boiling tank, an electronically controlled water fill valve for providing water to the boiling tank, a plurality of boiling electrodes disposed within the boiling tank for conducting current from an AC source through the water for generating steam, an electronic control for controlling both the flow of current from the AC source to the boiling electrodes and the addition of water to the boiling tank, said electronic control comprising:
    current detection means for measuring the flow of current from the AC source to the boiling electrodes;
    comparator means connected to said current detection means for comparing said measured current flow to a reference current level and producing a first comparator output when said measured current flow is less than said reference current level and a second comparator output when said measured current flow is equal to or greater than said reference level;

fill valve control means connected to said comparator means for actuating said fill valve to add water to said boiling tank in response to said first comparator output and de-actuating said fill valve in response to said second comparator output;

reference level determining means connected to said comparator means for establishing said reference current level at a first predetermined level for an initial operation of the humidifier;

means for detecting a transition from said second comparator output to said first comparator output, which transition corresponds to a decrease of measured current after said reference current initially has reached said first predetermined level; and means responsive to said detected transition for changing said reference current level for subsequent operations of the humidifier from said first predetermined level to a second predetermined level which is higher than said first predetermined level.

* * * * *